United States Patent
Cho et al.

(10) Patent No.: US 8,203,619 B2
(45) Date of Patent: Jun. 19, 2012

(54) TARGET BIT RATE DECISION METHOD FOR WAVELET-BASED IMAGE COMPRESSION

(75) Inventors: Yushin Cho, Sunnyvale, CA (US); Daisuke Hiranaka, Kawasaki (JP); Jeongnam Youn, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 342 days.

(21) Appl. No.: 12/570,976

(22) Filed: Sep. 30, 2009

(65) Prior Publication Data

US 2011/0074967 A1    Mar. 31, 2011

(51) Int. Cl.
*H04N 5/228* (2006.01)
*H04N 7/12* (2006.01)
*H04N 11/02* (2006.01)
*H04N 11/04* (2006.01)

(52) U.S. Cl. ............... 348/222.1; 348/231.1; 348/384.1; 348/390.1; 375/240.19

(58) Field of Classification Search ............... 348/231.1, 348/231.2, 231.3, 231.6, 231.9, 384.1, 390.1, 348/399.1, 407.1, 438.1, 231.99; 382/238, 382/239, 248, 250, 251; 375/240.18, 240.19, 375/240.24; 386/326, 328, 353, 355, 356
See application file for complete search history.

(56) References Cited

U.S. PATENT DOCUMENTS

| | | | |
|---|---|---|---|
| 5,495,292 A | 2/1996 | Zhang et al. | |
| 6,243,497 B1* | 6/2001 | Chiang et al. | 382/251 |
| 7,477,789 B2* | 1/2009 | Chao et al. | 382/232 |
| 2006/0045368 A1* | 3/2006 | Mehrotra | 382/239 |
| 2006/0109339 A1* | 5/2006 | Chao et al. | 348/14.01 |
| 2009/0290045 A1* | 11/2009 | Fukuda et al. | 348/231.99 |

* cited by examiner

*Primary Examiner* — Aung S Moe
*Assistant Examiner* — Chriss Yoder, III
(74) *Attorney, Agent, or Firm* — Haverstock & Owens LLP

(57) ABSTRACT

A method of deciding a target bit rate for wavelet-based image encoding based on the wavelet coefficients is described. The target bit rate is used for maintaining a high quality image. A minimum target bit rate and a maximum target bit rate are determined. A pseudo code length corresponding to the minimum target bit rate is calculated. The pseudo code length is calculated as a function of the wavelet coefficients. The corresponding pseudo code length is calculated for the maximum target bit rate. A curve between the pseudo code length and target bit rate is derived. Slope of the curve depends on buffer fullness. Using the curve, for a given pseudo code length, an appropriate target bit rate is derived. The derived target bit rate depends on the image content, and computing resources are able to be optimally used to attain similar quality for each image block of an image.

19 Claims, 6 Drawing Sheets

TARGET BIT RATE DECISION METHOD FOR WAVELET-BASED IMAGE COMPRESSION

FIELD OF THE INVENTION

The present invention relates to the field of image/video processing. More specifically, the present invention relates to image/video compression.

BACKGROUND OF THE INVENTION

When displaying an image or a video there is a minimum amount of bits needed to be able to display the image/video without a degradation in quality. Since an image/video is able to have varying amounts of detail, if equal amounts of bits are given to the low detail blocks of the image as the high detail blocks, it is possible that bit resources will be wasted on the low detail blocks leaving the bit resources lacking for the high detail blocks which will cause poor image quality.

Previous methods have encoded wavelet coefficients bit-plane by bitplane, until a certain target bitplane is reached. However, this process is computationally complex.

SUMMARY OF THE INVENTION

A method of deciding a target bit rate for wavelet-based image encoding based on the wavelet coefficients is described. The target bit rate is used for maintaining a high quality image. A minimum target bit rate and a maximum target bit rate are determined. A pseudo code length corresponding to the minimum target bit rate is calculated. The pseudo code length is calculated as a function of the wavelet coefficients. The corresponding pseudo code length is calculated for the maximum target bit rate. A curve between the pseudo code length and target bit rate is derived. Slope of the curve depends on buffer fullness. Using the curve, for a given pseudo code length, an appropriate target bit rate is derived. The derived target bit rate depends on the image content, and computing resources are able to be optimally used to attain similar quality for each image block of an image.

In one aspect, a method of compressing an image implemented on a device comprises detecting using a processor varying complexity values in portions of an image, determining a remaining buffer space of a buffer and allocating a number of bits based on the complexity values of the portions of the image and the remaining buffer space. The complexity values are each a sum of wavelet coefficients of pixels of a portion of the image. A higher remaining buffer space results in a higher number of bits allocated for a portion of the image and a lower remaining buffer space results in a lower number of bits allocated for the portion of the image. Allocating the number of bits is automatic. The portions of the image are image blocks.

In another aspect, a method of compressing an image implemented on a device comprises detecting using a processor a first complexity value of a first portion of the image and a second complexity of a second portion of the image wherein the first complexity value is different from the second complexity value and allocating a first amount of bits for the first portion of the image and allocating a second amount of bits for the second portion of the image. The method further comprises determining a remaining buffer space amount. The remaining buffer space amount affects the first amount of bits and the second amount of bits. A higher remaining buffer space results in a higher amount of bits allocated and a lower remaining buffer space results in a lower amount of bits allocated. The method further comprising selecting a target bit rate. Selecting the target bit rate is automatic. Alternatively, selecting the target bit rate is manual. The first portion and the second portion are image blocks. Allocating the first amount of bits is based on computing a first sum of wavelet coefficients of pixels of the first portion of the image and a fullness of a buffer, and allocating the second amount of bits is based on computing a second sum of wavelet coefficients of pixels of the second portion of the image and the fullness of the buffer.

In another aspect, a system programmed in a memory on a device comprises an encoding module for encoding an image and a bit rate module for determining the bit rate for each portion of the image, wherein the bit rate module is for detecting a complexity value for each portion of the image, determining a remaining buffer space and allocating an amount of bits for each portion of the image based on the complexity value and the remaining buffer space. The complexity value is a sum of wavelet coefficients of pixels of a portion of the image. A higher complexity value results in a higher number of bits allocated for a portion of the image and a lower complexity value results in a lower number of bits allocated for the portion of the image. A higher remaining buffer space results in a higher number of bits allocated for a portion of the image and a lower remaining buffer space results in a lower number of bits allocated for the portion of the image. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application for detecting varying complexity values in portions of an image, determining a remaining buffer space and allocating a number of bits based on the complexity of the portions of the image and the remaining buffer space and a processing component coupled to the memory, the processing component configured for processing the application.

In yet another aspect, a camera device comprises an image acquisition component for acquiring an image, a codec for encoding the image by computing a complexity value for each portion of the image, determining a remaining buffer space, allocating an amount of bits for each portion of the image based on the complexity value and the remaining buffer space and compressing the portion of the image resulting in a resulting bit stream, a buffer for temporarily storing the resulting bit stream and a memory for storing a compressed image containing each of the resulting bit stream.

DETAILED DESCRIPTION OF THE PREFERRED EMBODIMENT

A method of deciding a target bit rate for wavelet-based image encoding based on the wavelet coefficients is described herein. A target bit rate is used for maintaining a high quality image. In some embodiments, a minimum target bit rate below which the image quality is not able to be guaranteed is determined. A pseudo code length corresponding to the minimum target bit rate is calculated. The pseudo code length is able to be calculated as a function of the wavelet coefficients. A maximum target bit rate above which the image quality is not able to be improved significantly is also determined. The corresponding pseudo code length is calculated for the maximum target bit rate. A curve between the pseudo code length and target bit rate is derived. Slope of the curve depends on buffer fullness. Using the curve, for a given pseudo code length, an appropriate target bit rate is able to be derived. The derived target bit rate depends on the image content, and computing resources are able to be optimally used to attain similar quality for each image block of an image.

Figure 1:
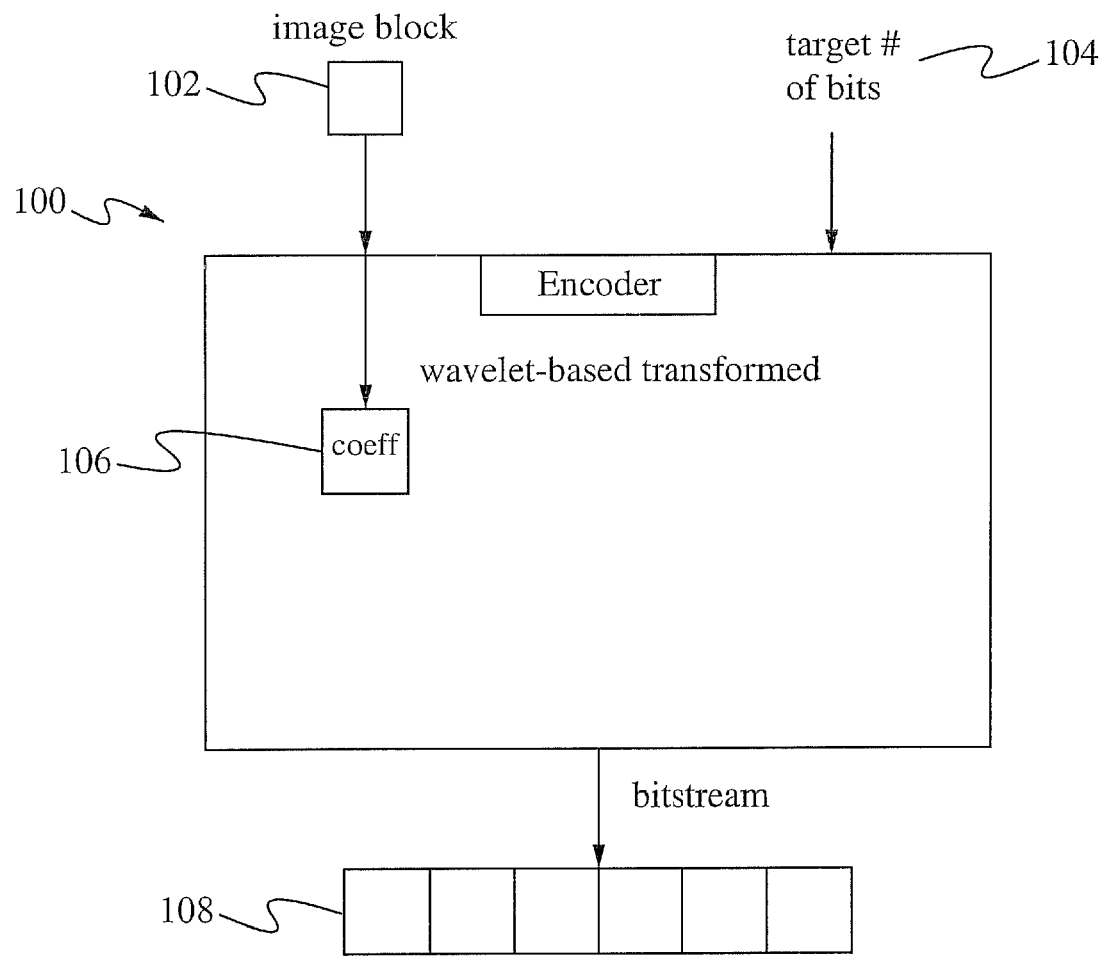
FIG. 1 illustrates a block diagram of an encoder implementing a target bit decision method according to some embodiments.

FIG. 1 illustrates a block diagram of an encoder 100 implementing a target bit decision method according to some embodiments. The encoder 100 receives an image block 102 (e.g. a portion of an image) and a target number of bits 104. The image block is able to be any size, for example, 4×4 pixels or 16×16 pixels. The image block is transformed into frequency domain coefficients 106. The target number of bits 104 is determined by the coefficients 106. A coefficient magnitude is able to be represented in 3-D as a height. Sign information for each coefficient value is also able to be determined. Each coefficient is labeled C with an index k where k=0 to 15. Then, the sum of the coefficient values, $$\sum_{k=0}^{15} C_k,$$

varies from 0 to a maximum number. If an image content is very complex, then the sum of coefficient values tends to be high compared with a non-complex image content. Based on the summation of the coefficients, the target number of bits 104 is able to be determined. Since the magnitude of the value increases the number of bits needed, the summation actually uses logarithm for proper functionality, such that the calculation is $$\sum_{x=0}^{15} \log_2(|C_x|),$$

which is referred to as the pseudo_code_length. The image block 102 is encoded and the result is a resultant bitstream 108 which is at least very close in number to the target number of bits 104. The encoder 100 is a wavelet-based encoder. An example of a wavelet-based compression standard is JPEG 2000.

Figure 2:
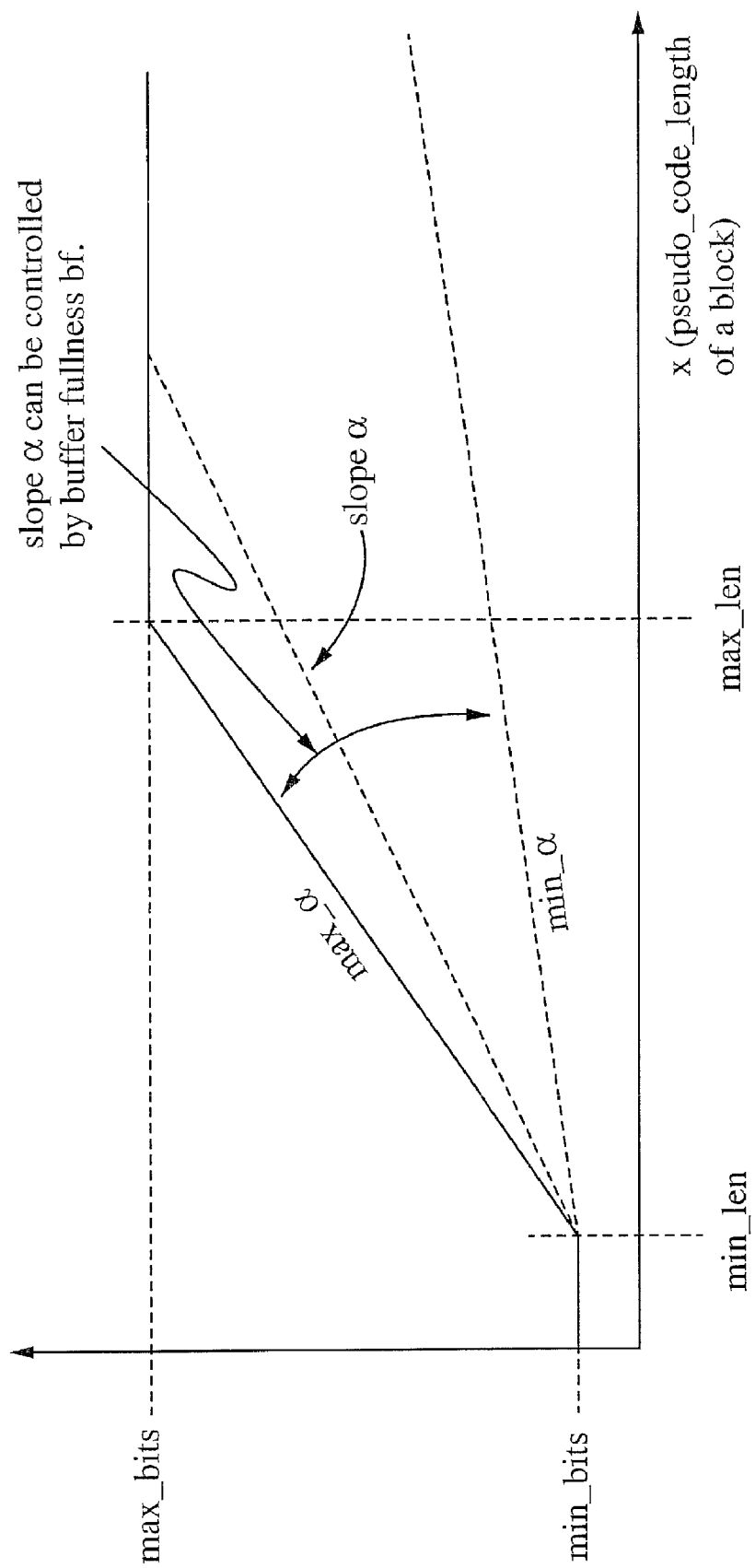
FIG. 2 illustrates a graph of a target bit decision method according to some embodiments.

FIG. 2 illustrates a graph of a target bit decision method according to some embodiments. A vertical axis is the number of target bits (T). A horizontal axis is a pseudo_code_length of an image block. For the number of target bits, a minimum amount of bits are needed for non-coefficient information and a maximum amount of bits are limited because quality reaches near lossless at this point. For the pseudo_code_length, at least a minimum length is used and no more than a designated maximum length is used. A slope α changes based on the fullness of a buffer. Maximum and minimum slopes designate a range of slope. Given a pseudo_code_length and a slope, a target number of bits is able to be determined. For example, if a buffer is mostly full, then a lower number of target bits is able to be set. If a buffer is mostly empty, a higher number of target bits is able to be set. Similarly, if a pseudo_code_length is big, indicating a complex image, the target number of bits is able to be set higher, and conversely lower for a less complex image.

Figure 3:
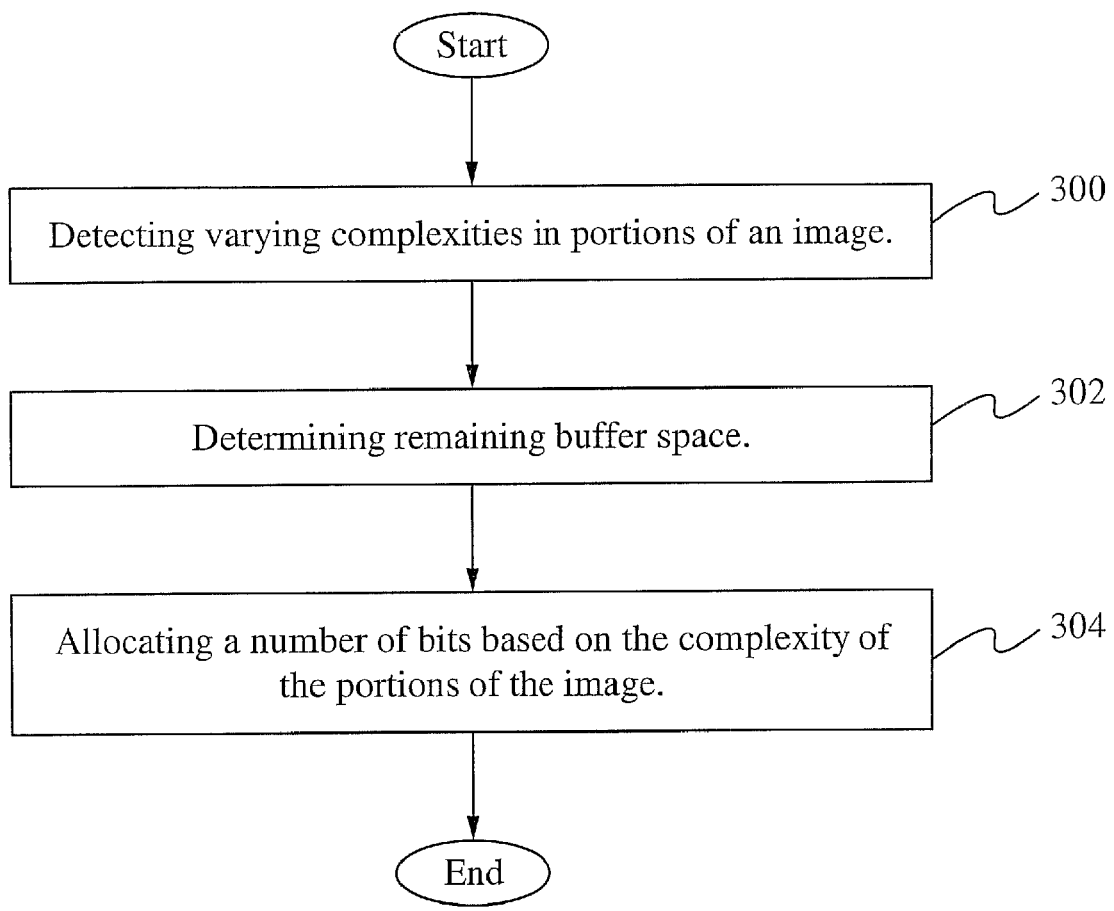
FIG. 3 illustrates a flowchart of a method of utilizing the target bit method according to some embodiments.

FIG. 3 illustrates a flowchart of a method of utilizing the target bit method according to some embodiments. In the step 300, complexities of portions of an image are detected. For example, complex portions and simple portions of images are detected. Examples of complex portions are portions that are highly detailed such as a detailed shirt. Examples of simple portions are a blue sky without clouds. Varying degrees of complexity are able to be detected. The complexity of the image is able to be detected using any method. One method of detecting the complexity is to determine a pseudo_code_length, such as by computing the sum of the coefficients of the pixels of the portion of the image. In the step 302, a remaining buffer space is determined. In the step 304, a number of bits are allocated based on the complexity of the portion and/or the remaining buffer space. As described herein, if the portion of the image is complex and the remaining buffer space is high, then a significant amount of bits are able to be allocated for this portion of the image. If the portion of the image is simple and not much buffer space remains, then the number of bits allocated for this portion of the image is low. In some embodiments, the order of the steps is variable and is able to be changed. For example, the buffer fullness is able to be determined first. Once the bits are allocated, the process such as image compression occurs using the allocated bits which results in a bit stream containing the compressed image portion. In some embodiments, one or more of the steps are able to be skipped or varied slightly. For example, if the buffer fullness is known in advance, then it does not need to be detected.

Figure 4:
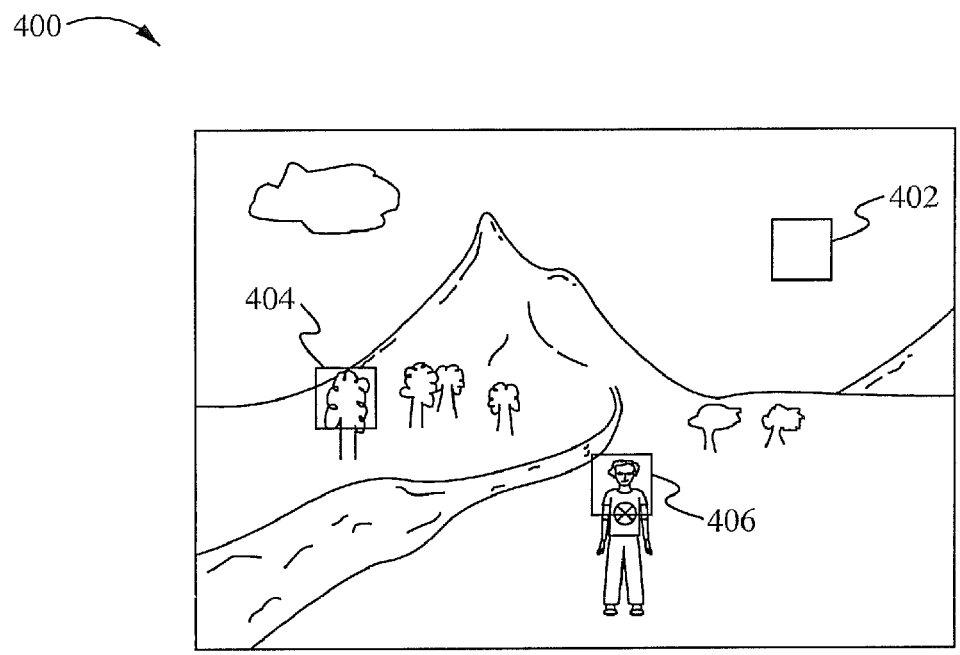
FIG. 4 illustrates an exemplary image with varying complexities according to some embodiments.

FIG. 4 illustrates an exemplary image 400 with varying complexities according to some embodiments. A portion 402 of the sky is a very simple portion with roughly the same color and texture. A portion 404 of the landscape is a slightly more complex portion of the image 400 with parts of trees, mountain and sky having differing colors and textures. A portion 406 of the person with a highly detailed shirt is a very complex portion including facial features, a shirt with many colors and details. Assuming the same amount of buffer space available, fewer bits will be allocated for the sky portion 402; more bits will be allocated for the landscape portion 404 and even more bits will be allocated for the person/shirt portion 406. These three portions are meant as examples and are not meant to be limitations.

Figure 5:
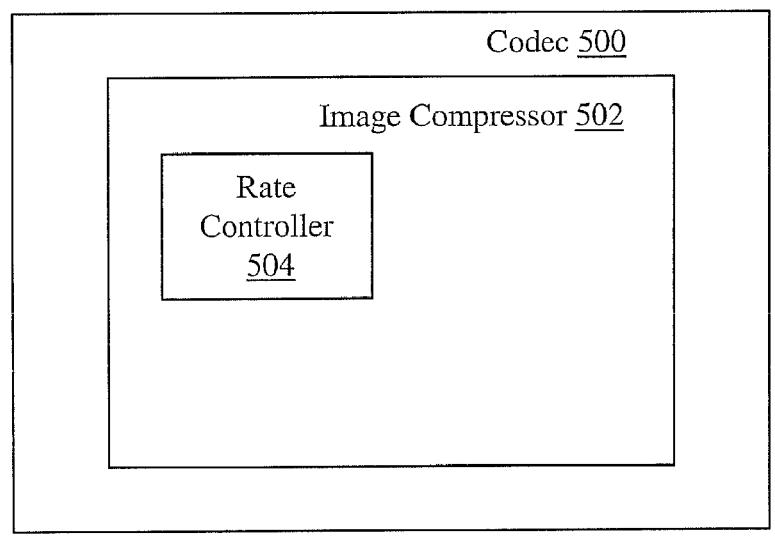
FIG. 5 illustrates a block diagram of a codec according to some embodiments.

FIG. 5 illustrates a block diagram of a codec 500 according to some embodiments. The codec 500 includes an image compressor 502, a rate controller 504 and any additional components. The image compressor 502 compresses an input image. The rate controller 504 determines the rate at which bits are used for portions of the input image. The codec 500 is able to be implemented in hardware, software, firmware or any combination thereof. If the codec is implemented in software, it is implemented on a device and is stored in a memory or a computer readable medium.

Figure 6:
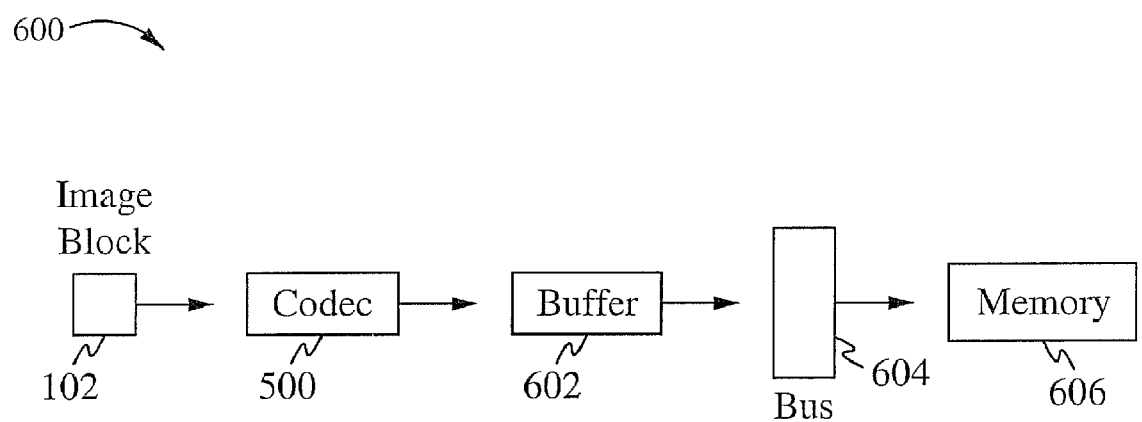
FIG. 6 illustrates a system for utilizing the target bit method according to some embodiments.

FIG. 6 illustrates a system 600 for utilizing the target bit method according to some embodiments. The system 600 receives an image block (or portion) of an image. The codec 500 encodes (including compresses) the image block 102. The codec 500 is also able to decode (and decompress) the image block 102. As described herein, the codec 500 allocates a number of bits for each image block 102 depending on the complexity of the image block and the amount of space available in a buffer 602. The buffer 602 is used to store the compressed image data as it is being transferred to a memory 606 over a bus 604, since the bus 604 has a limited bandwidth.

Figure 7:
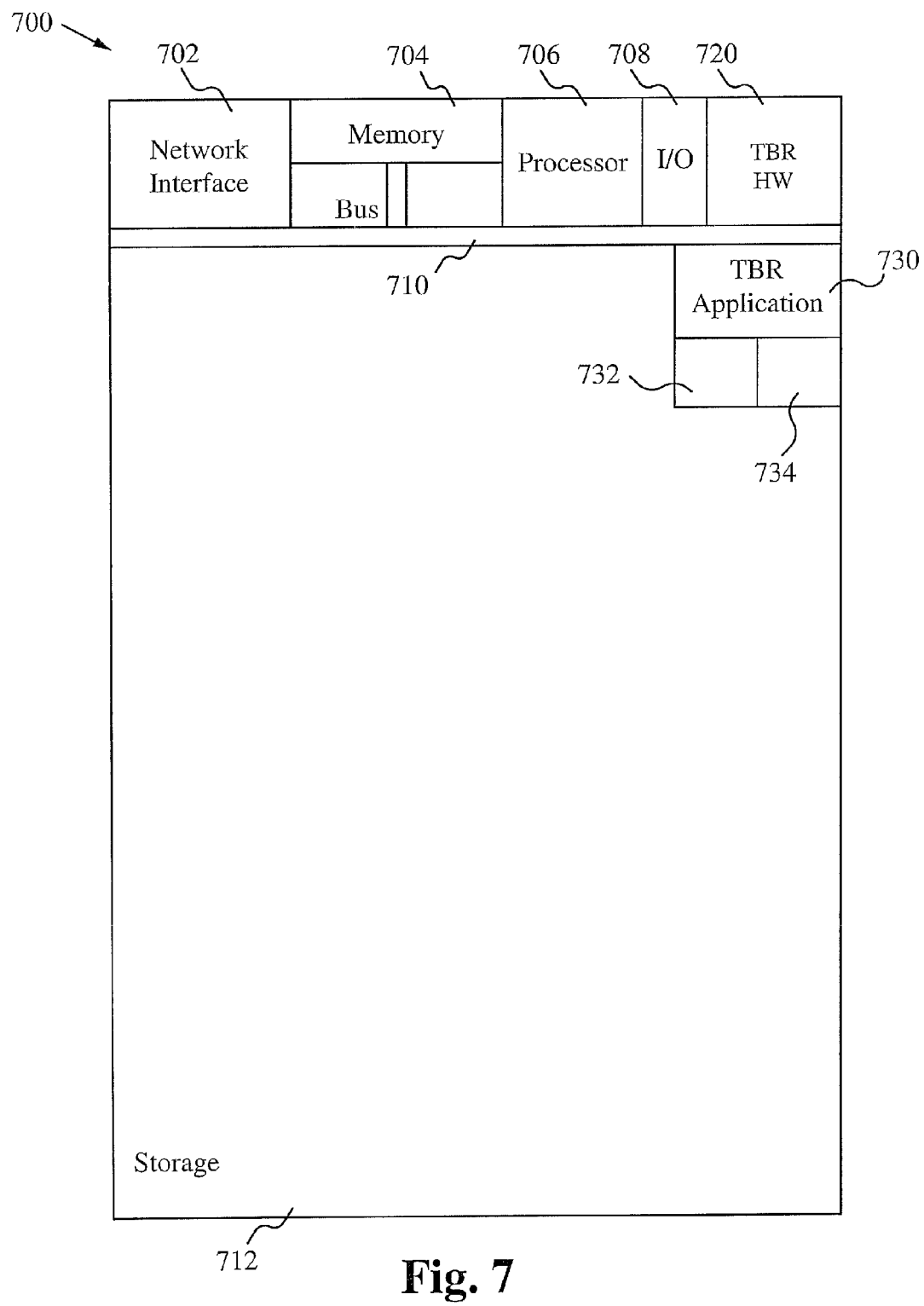
FIG. 7 illustrates a block diagram of an exemplary computing device configured to implement the target bit rate method according to some embodiments.

FIG. 7 illustrates a block diagram of an exemplary computing device 700 configured to implement the target bit rate method according to some embodiments. The computing device 700 is able to be used to acquire, store, compute, communicate and/or display information such as images and videos. For example, a computing device 700 is able to acquire and store an image. The target bit rate method is able to be used in compressing an image when encoding on the device 700. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. Target bit rate application(s) 730 used to perform the target bit rate method are likely to be stored in the storage device 712 and memory 704 and processed as applications are typically processed. More or less components shown in FIG. 7 are able to be included in the computing device 700. In some embodiments, target bit rate hardware 720 is included. Although the computing device 700 in FIG. 7 includes applications 730 and hardware 720 for target bit rate applications, the target bit rate method is able to be implemented on a computing device in hardware, firmware, software or any combination thereof.

In some embodiments, the target bit rate application(s) 730 include several applications and/or modules. In some embodiments, the target bit rate application(s) 730 include an encoding module 732 configured for encoding an image and a bit rate module 734 configured for determining the bit rate for each portion of the image. The bit rate is determined based on the complexity of the image and the buffer space as described herein. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

To utilize the target bit rate method, a user acquires an image such as on a digital camera, and while the image is acquired and encoded, the target bit rate method automatically determines the appropriate bit rate for portions of the image based on the complexity and remaining space of a buffer. The target bit rate method occurs automatically without user involvement.

In operation, the target bit rate method utilizes varying bit rates when compressing an image based on the complexity of the portion of the image. For more complex portions of the image, a higher bit stream is used, and for less complex portions, a lower bit stream is used. Additionally, the remaining space of a buffer is considered in determining the bit stream size. If the buffer is almost full, then the bit stream size is decreased appropriately. However, if the buffer is almost empty, then the bit stream size is increased appropriately. The target bit rate method enables better compression for images with less loss of quality using a less complex method than prior attempts.

Some Embodiments of Target Bit Rate Determination

1. A method of compressing an image implemented on a device comprising:
    a. detecting using a processor varying complexity values in portions of an image;
    b. determining a remaining buffer space of a buffer; and
    c. allocating a number of bits based on the complexity values of the portions of the image and the remaining buffer space.
2. The method of clause 1 wherein the complexity values are each a sum of wavelet coefficients of pixels of a portion of the image.
3. The method of clause 1 wherein a higher remaining buffer space results in a higher number of bits allocated for a portion of the image and a lower remaining buffer space results in a lower number of bits allocated for the portion of the image.
4. The method of clause 1 wherein allocating the number of bits is automatic.
5. The method of clause 1 wherein the portions of the image are image blocks.
6. A method of compressing an image implemented on a device comprising:
    a. detecting using a processor a first complexity value of a first portion of the image and a second complexity of a second portion of the image wherein the first complexity value is different from the second complexity value; and
    b. allocating a first amount of bits for the first portion of the image and allocating a second amount of bits for the second portion of the image.
7. The method of clause 6 further comprising determining a remaining buffer space amount.
8. The method of clause 7 wherein the remaining buffer space amount affects the first amount of bits and the second amount of bits.
9. The method of clause 8 wherein a higher remaining buffer space results in a higher amount of bits allocated and a lower remaining buffer space results in a lower amount of bits allocated.
10. The method of clause 1 further comprising selecting a target bit rate.
11. The method of clause 1 wherein selecting the target bit rate is automatic.
12. The method of clause 1 wherein selecting the target bit rate is manual.
13. The method of clause 1 wherein the first portion and the second portion are image blocks.
14. The method of clause 1 wherein allocating the first amount of bits is based on computing a first sum of wavelet coefficients of pixels of the first portion of the image and a fullness of a buffer, and allocating the second amount of bits is based on computing a second sum of wavelet coefficients of pixels of the second portion of the image and the fullness of the buffer.

15. A system programmed in a memory on a device comprising:
   a. an encoding module for encoding an image; and
   b. a bit rate module for determining the bit rate for each portion of the image, wherein the bit rate module is for detecting a complexity value for each portion of the image, determining a remaining buffer space and allocating an amount of bits for each portion of the image based on the complexity value and the remaining buffer space.

16. The system of clause 15 wherein the complexity value is a sum of wavelet coefficients of pixels of a portion of the image.

17. The system of clause 15 wherein a higher complexity value results in a higher number of bits allocated for a portion of the image and a lower complexity value results in a lower number of bits allocated for the portion of the image.

18. The system of clause 15 wherein a higher remaining buffer space results in a higher number of bits allocated for a portion of the image and a lower remaining buffer space results in a lower number of bits allocated for the portion of the image.

19. The system of clause 15 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

20. A device comprising:
   a. a memory for storing an application, the application for:
      i. detecting varying complexity values in portions of an image;
      ii. determining a remaining buffer space; and
      iii. allocating a number of bits based on the complexity of the portions of the image and the remaining buffer space; and
   b. a processing component coupled to the memory, the processing component configured for processing the application.

21. A camera device comprising:
   a. an image acquisition component for acquiring an image;
   b. a codec for encoding the image by:
      i. computing a complexity value for each portion of the image;
      ii. determining a remaining buffer space;
      iii. allocating an amount of bits for each portion of the image based on the complexity value and the remaining buffer space; and
      iv. compressing the portion of the image resulting in a resulting bit stream;
   c. a buffer for temporarily storing the resulting bit stream; and
   d. a memory for storing a compressed image containing each of the resulting bit stream.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of compressing an image implemented on a device comprising:
   a. detecting using a processor varying complexity values in portions of an image;
   b. determining a remaining buffer space of a buffer; and
   c. allocating a number of bits based on the complexity values of the portions of the image and the remaining buffer space, wherein the complexity values are each a sum of wavelet coefficients of pixels of a portion of the image.

2. The method of claim 1 wherein a higher remaining buffer space results in a higher number of bits allocated for a portion of the image and a lower remaining buffer space results in a lower number of bits allocated for the portion of the image.

3. The method of claim 1 wherein allocating the number of bits is automatic.

4. The method of claim 1 wherein the portions of the image are image blocks.

5. The method of claim 1 further comprising selecting a target bit rate.

6. The method of claim 5 wherein selecting the target bit rate is automatic.

7. The method of claim 5 wherein selecting the target bit rate is manual.

8. A method of compressing an image implemented on a device comprising:
   a. detecting using a processor a first sum of wavelet coefficients of pixels of a first portion of the image and a second sum of wavelet coefficients of pixels of a second portion of the image wherein the first sum of wavelet coefficients of pixels is different from the second sum of wavelet coefficients of pixels; and
   b. allocating a first amount of bits for the first portion of the image and allocating a second amount of bits for the second portion of the image.

9. The method of claim 8 further comprising determining a remaining buffer space amount.

10. The method of claim 9 wherein the remaining buffer space amount affects the first amount of bits and the second amount of bits.

11. The method of claim 10 wherein a higher remaining buffer space results in a higher amount of bits allocated and a lower remaining buffer space results in a lower amount of bits allocated.

12. The method of claim 8 wherein the first portion and the second portion are image blocks.

13. A system programmed in a memory on a device comprising:
   a. an encoding module for encoding an image; and
   b. a bit rate module for determining the bit rate for each portion of the image, wherein the bit rate module is for detecting a complexity value for each portion of the image, determining a remaining buffer space and allocating an amount of bits for each portion of the image based on the complexity value and the remaining buffer space, wherein the complexity value is a sum of wavelet coefficients of pixels of a portion of the image.

14. The system of claim 13 wherein the complexity value is a sum of wavelet coefficients of pixels of a portion of the image.

15. The system of claim 13 wherein a higher complexity value results in a higher number of bits allocated for a portion of the image and a lower complexity value results in a lower number of bits allocated for the portion of the image.

16. The system of claim 13 wherein a higher remaining buffer space results in a higher number of bits allocated for a portion of the image and a lower remaining buffer space results in a lower number of bits allocated for the portion of the image.

17. The system of claim 13 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

18. A device comprising:
   a. a memory for storing an application, the application for:
      i. detecting varying complexity values in portions of an image;
      ii. determining a remaining buffer space; and
      iii. allocating a number of bits based on the complexity of the portions of the image and the remaining buffer space, wherein the complexity values are each a sum of wavelet coefficients of pixels of a portion of the image; and
   b. a processing component coupled to the memory, the processing component configured for processing the application.

19. A camera device comprising:
   a. an image acquisition component for acquiring an image;
   b. a codec for encoding the image by:
      i. computing a complexity value for each portion of the image;
      ii. determining a remaining buffer space;
      iii. allocating an amount of bits for each portion of the image based on the complexity value and the remaining buffer space, wherein the complexity value is a sum of wavelet coefficients of pixels of a portion of the image; and
      iv. compressing the portion of the image resulting in a resulting bit stream;
   c. a buffer for temporarily storing the resulting bit stream; and
   d. a memory for storing a compressed image containing each of the resulting bit stream.

* * * * *